United States Patent
Imai et al.

(10) Patent No.: US 7,726,204 B2
(45) Date of Patent: Jun. 1, 2010

(54) HEAT SIGNAL WRITING DEVICE

(75) Inventors: Hiroshi Imai, Gyoda (JP); Keiichi Matsushima, Gyoda (JP); Yoshihiro Ushigusa, Gyoda (JP)

(73) Assignee: Surpass Industry Co., Ltd., Gyoda-shi (JP)

( * ) Notice: Subject to any disclaimer, the term of this patent is extended or adjusted under 35 U.S.C. 154(b) by 121 days.

(21) Appl. No.: 12/224,627

(22) PCT Filed: Mar. 5, 2007

(86) PCT No.: PCT/JP2007/054228

§ 371 (c)(1),
(2), (4) Date: Sep. 2, 2008

(87) PCT Pub. No.: WO2007/102475

PCT Pub. Date: Sep. 13, 2007

(65) Prior Publication Data

US 2009/0126503 A1    May 21, 2009

(30) Foreign Application Priority Data

Mar. 6, 2006    (JP) .............................. 2006-059093

(51) Int. Cl.
*G01F 1/708*    (2006.01)
(52) U.S. Cl. .................................................. 73/861.95
(58) Field of Classification Search .................. None
See application file for complete search history.

(56) References Cited

U.S. PATENT DOCUMENTS 4,483,200 A * 11/1984 Togawa et al. ........... 73/861.95
5,526,696 A *  6/1996 Cappi ...................... 73/861.95
5,719,341 A *  2/1998 Reynolds et al. ......... 73/861.95
6,289,746 B1 * 9/2001 Fu et al. .................. 73/861.95

(Continued)

FOREIGN PATENT DOCUMENTS

JP    05-264567    10/1993

(Continued)

OTHER PUBLICATIONS

International Search Report mailed May 1, 2007, issued on PCT/JP2007/054228.

*Primary Examiner*—Harshad Patel
(74) *Attorney, Agent, or Firm*—Edwards Angell Palmer & Dodge LLP

(57) ABSTRACT

A heat signal writing device forming a clear writing pattern of a heat signal is provided. A heat signal writing device 10 for writing a heat signal in a medium traveling through a channel, which is secured to an appropriate position on the channel through which the medium flows, includes a Peltier element 11 for writing the heat signal having a temperature change according to a desired pattern by heating or cooling; a channel supporting member 12 shaped as a pyramid formed of a heat conductive material and having a bottom surface in close contact with a surface of the Peltier element 11, the tip of the pyramid being in direct contact with the channel 1; a heat sink 13 in close contact with another surface of the Peltier element 11; and a heat-resistant cover for covering the periphery of the Peltier element 11, excluding a channel contact surface 12a at the tip, and the channel supporting member 12.

3 Claims, 3 Drawing Sheets

U.S. PATENT DOCUMENTS

| | | | |
|---|---|---|---|
| 7,077,002 B2 * | 7/2006 | Sejrsen et al. | 73/204.26 |
| 7,470,919 B2 * | 12/2008 | Elgar et al. | 250/492.1 |
| 2009/0025473 A1 * | 1/2009 | Imai et al. | 73/204.14 |

FOREIGN PATENT DOCUMENTS

| | | |
|---|---|---|
| JP | 08-338746 | 12/1996 |
| JP | 2002-333357 | 11/2002 |
| JP | 2003-202256 | 7/2003 |
| JP | 2004-184177 | 7/2004 |
| JP | 2005-140756 | 6/2005 |

* cited by examiner

HEAT SIGNAL WRITING DEVICE

TECHNICAL FIELD

The present invention relates to a heat signal writing device used applied to a thermal flow rate detector (flowmeter) for measuring the traveling velocity of a fluid by, for example, detecting a heat signal (temperature change) written in a medium.

BACKGROUND ART

Background Art

Thermal flowmeters for measuring the mass flow of a liquid using heat have been proposed in the past. In this case, heat is used to a detect temperature change, a temperature difference between two points, or a time difference in a temperature change etc.

A heat transfer fluid detecting apparatus for measuring the angular velocity and the flow rate of a fluid acting in a channel on the basis of the change in the traveling time of heat through a fluid serving as a medium is proposed. With this apparatus, the fluid flowing through the channel is heated by an AC-driven heating element, and the heat transferred by this fluid is detected by a heat sensor, which is provided downstream. In this way, angular velocity can be detected on the basis of the phase difference between the driving signal for the heating element and the detection signal from the heat sensor, or the flow rate can be determined by determining the heat traveling time on the basis of the phase difference between a waveform detected at the heat sensor and the heating AC waveform. (For example, refer to Patent Document 1).

Patent Document 1: Japanese Unexamined Patent Application, Publication No. HEI-5-264567

DISCLOSURE OF INVENTION

With the above-described thermal flowmeter, the thermal flowmeter is required to provide a clear writing pattern of a heat signal in order to further increase the detection accuracy. In other words, if the writing pattern of the heat signal is vague and unclear, the pattern of the heat signal detected downstream becomes even more unclear, thus causing a large error in the phase difference detected on the basis of the waveforms of both patterns. Therefore, it is important to make the writing pattern of the heat signal clear in order to improve the detection accuracy of the flow rate calculated from the phase difference and so on.

The present invention has been conceived in light of the above-described problems, and an object thereof is to provide a heat signal writing device providing a clear heat signal writing pattern.

To solve the problems described above, the present invention provides the following solutions.

The present invention provides a heat signal writing device for writing a heat signal in a medium traveling through a channel, the device being secured to an appropriate position on the channel through which the medium flows, the device including a heat source element for writing the heat signal having a temperature change according to a desired pattern by heating or cooling; a channel supporting member shaped as a pyramid formed of a heat conductive material and having a bottom surface in close contact with a surface of the heat source element, the tip of the pyramid being in direct contact with the channel; a heat radiating member in close contact with another surface of the heat source element; and a heat-resistant cover for covering the periphery of the heat source element, excluding the channel contact surface at the tip, and the channel supporting member.

Because this heat signal writing device has a configuration including a heat source element for writing the heat signal having a temperature change according to a desired pattern by heating or cooling; a channel supporting member shaped as a pyramid formed of a heat conductive material and having a bottom surface in close contact with a surface of the heat source element, the tip of the pyramid being in direct contact with the channel; a heat radiating member in close contact with another surface of the heat source element; and a heat-resistant cover for covering the periphery of the heat source element, excluding the channel contact surface at the tip, and the channel supporting member, the following advantages are obtained:

1) the area of the channel contact surface can be minimized because the tips of the pyramids directly contact the channel to write a heat signal;

2) the writing position of the heat signal can be limited to the channel contact surface and the effect of the ambient temperature to the heat signal writing can be minimized because the periphery of the heat source elements, excluding the channel contact surfaces at the tips, and the channel supporting members are covered with a heat-resistant material;

3) a clear desired temperature change can be brought about due to an increase in the radiation ability of the heat source elements by providing a heat-radiating material in close contact with the heat source elements.

With the above-described heat signal writing device, it is preferable that the heat signal writing device have a bisectional structure in which the tip of the channel supporting member supports the channel from both sides to write a heat signal. In this way, since a heat signal is written in such a manner that the entire circumference of the channel is covered, a heat signal that is substantially even throughout the medium flowing through the channel can be written.

With the above-described heat signal writing device, it is preferable that the heat source element be a Peltier element.

The above-described heat signal writing device according to the present invention includes the heat source element for writing the heat signal having a temperature change according to a desired pattern by heating or cooling; the channel supporting member shaped as a pyramid formed of a heat conductive material and having a bottom surface in close contact with a surface of the heat source element, the tip of the pyramid being in direct contact with the channel; the heat radiating member in close contact with another surface of the heat source element; and the heat-resistant cover for covering the periphery of the heat source element, excluding the channel contact surface at the tip, and the channel supporting member. Therefore, the area of the channel contact surface in direct contact with the channel to write a heat signal can be minimized; the writing position of the heat signal can be limited to the channel contact surface and the effect of the ambient temperature to the heat signal writing can be minimized; and a clear desired temperature change can be provided due to an increase in the radiation ability of the heat source elements. Therefore, a significant advantage is achieved; namely, a clear writing pattern of the heat signal written in the medium flowing through the channel is formed.

Accordingly, the detection accuracy of the thermal flowmeter using the heat signal writing device can be further improved.

EXPLANATION OF REFERENCE SIGNS

Explanation of Reference Signs

Figure 1A:
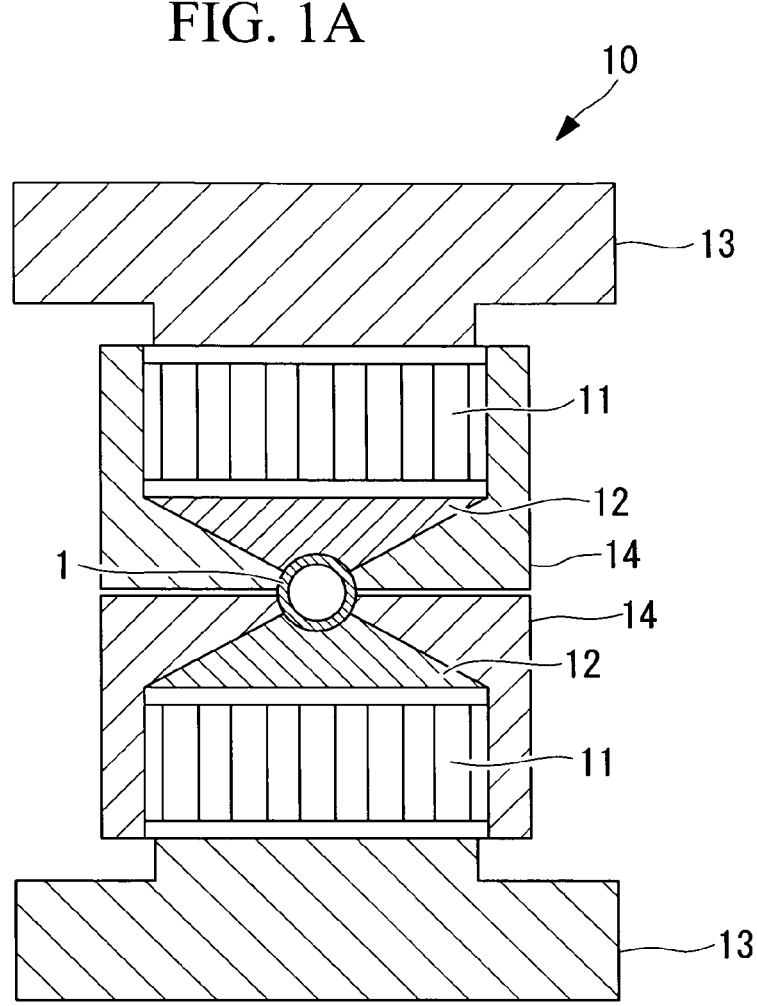
FIG. 1A illustrates an example configuration of a heat signal writing device according to an embodiment of the present invention and is a cross-sectional view taken along line A-A in FIG. 2A.

1: channel
10: heat signal writing device
11: Peltier element (heat-source element)
12: channel supporting member
12a: channel contact surface
13: heat sink (heat radiating member)
14: heat-resistant resin (heat-resistant cover)
20: temperature sensor
30: control unit

BEST MODE FOR CARRYING OUT THE INVENTION

A heat signal writing device according to an embodiment of the present invention will be described with reference to the drawings.

Figure 2A:
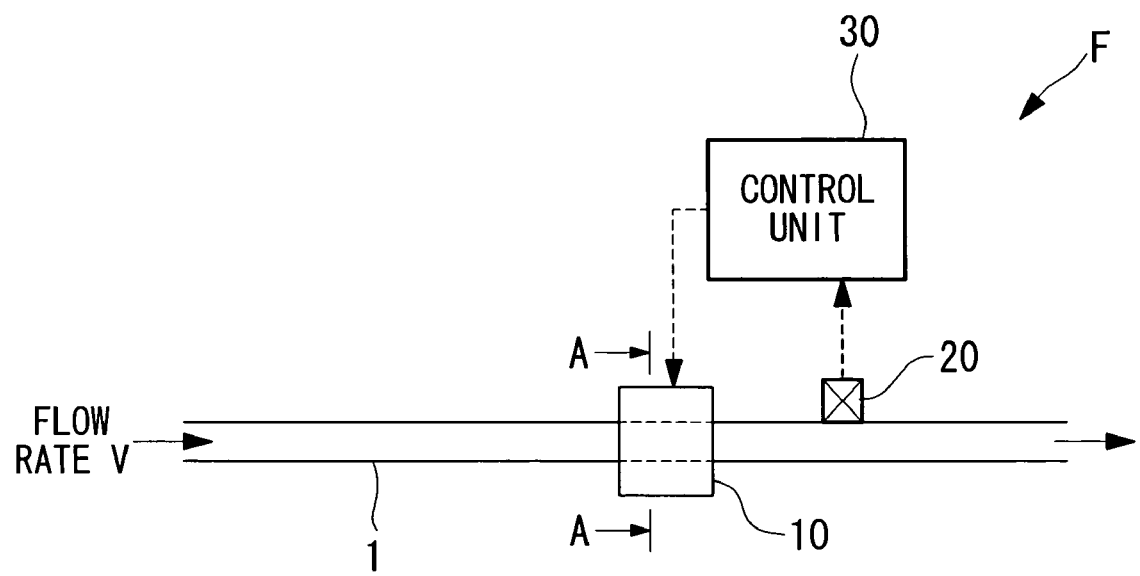
FIG. 2A is a plan view of a flow rate detector, according to an embodiment, using the heat signal writing device according to the present invention.
Figure 2B:
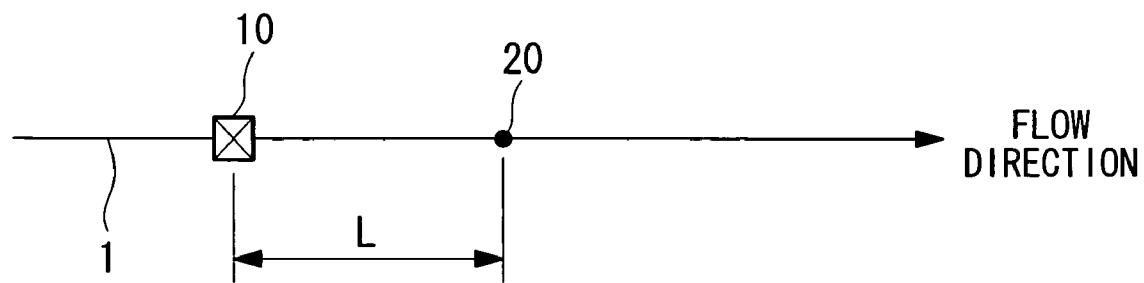
FIG. 2B illustrates a measured distance L.

A flow rate detector F, which is shown in FIG. 2A, includes a heat signal writing device 10, which is provided at an appropriate position in a channel 1; a temperature sensor 20, which is positioned away from the heat signal writing device 10 and detects the written heat signal; and a control unit 30, which is electrically wired to the heat signal writing device 10 and the temperature sensor 20.

The heat signal writing device 10 is secured at an appropriate position in the channel 1 through which a medium flows at a flow rate v and constitutes heat-signal writing means for writing a heat signal in the medium flowing through the channel 1. The heat signal writing device 10 is a device for writing a heat signal having a specific temperature change in the medium flowing through the channel 1 and is capable of writing a heat signal with a temperature change according to a desired pattern by heating or cooling using heat source elements 11, such as Peltier elements, as shown in FIG. 1A.

Peltier elements suitable for the heat source elements 11 are each constructed by bonding p-type and n-type thermoelectric semiconductors and copper electrodes and have a function of transferring and radiating heat absorbed from one bonding surface to another bonding surface by applying a direct current, for example, from the n-type thermoelectric semiconductor. Such heat absorption is referred to as the Peltier effect, and by reversing the flow direction of a direct current (toward the p-type thermoelectric semiconductor), the traveling direction of heat can be completely reversed. Therefore, heating and cooling can be reversed by controlling the power distribution in order to selectively switch between heating by radiation and cooling by absorption, and thus, highly accurate temperature control becomes possible. Hereinafter, the heat-source elements 11 are described as Peltier elements. However, it is also possible to use, for example, a metal resistor (such as nichrome wire) for heat generation, a high-frequency electromagnetic induction heater, a Seebeck effect element, a laser, a light source, or microwaves.

The heat signal writing device 10, which is shown in FIG. 1A, includes a pair of Peltier elements 11. The upper and lower surfaces of each Peltier element 11 are held between a copper channel supporting member 12 and a heat sink 13, respectively, the copper channel supporting member 12 having excellent heat conductivity, and the heat sink 13 being provided as a heat radiating member. A bisectional structure is constructed of a heat-resistant resin 14, which forms a heat-resistant cover, covering the periphery of the pairs of Peltier elements 11 and the channel supporting members 12, excluding a channel contact surface 12a of the channel supporting member 12, which supports the channel 1 by being in direct contact therewith. In such a case, it is preferable to use fluorine-containing resin, such as polytetrafluoroethylene, as the heat-resistant resin 14.

Figure 1B:
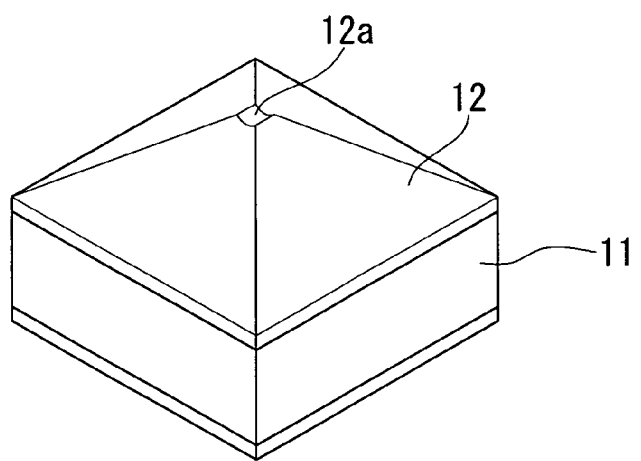
FIG. 1B is a perspective view of a channel supporting member in FIG. 1A.

The channel supporting members 12 are each shaped as a quadrangular pyramid, such as that shown in FIG. 1B, in order to minimize the contact area with the channel 1. The channel contact surface 12a, which contacts the channel 1 and writes a heat signal, is formed at the tip (apex) of the channel supporting member 12.

The pair of Peltier elements 11 is secured by suitable securing means while substantially the entire circumference of the channel 1 is surrounded by the channel contact surfaces 12a. Therefore, the positions where the channel contact surfaces 12a contact the channel 1 are the writing position of the heat signal by the heat signal writing device 10.

The temperature sensor 20 is mounted at a predetermined detection position away from the writing position where the heat signal writing device 10 wrote the heat signal and is heat-signal reading means for detecting the temperature of the medium passing by the detection position. In the example configuration of the flow rate detector F shown in FIG. 2A, the detection position is set by mounting the temperature sensor 20 at a measured distance L downstream of the writing position in the flow direction of the medium flowing through the channel 1. As the temperature sensor 20, for example, a thermocouple, a semiconductor temperature sensor, an infrared sensor, or a thermistor, including a posistor, can be used.

The control unit 30 is controlling means for the flow rate detector F and is connected to the above-described heat signal writing device 10 and temperature sensor 20 via wires. The control unit 30 has a function of calculating the traveling volume and traveling velocity of the medium by performing arithmetic processing based on, for example, the traveling distance (i.e., measured distance L) from the writing position of the heat signal to the detection position and the duration for which the heat signal is detected.

Figure 3:
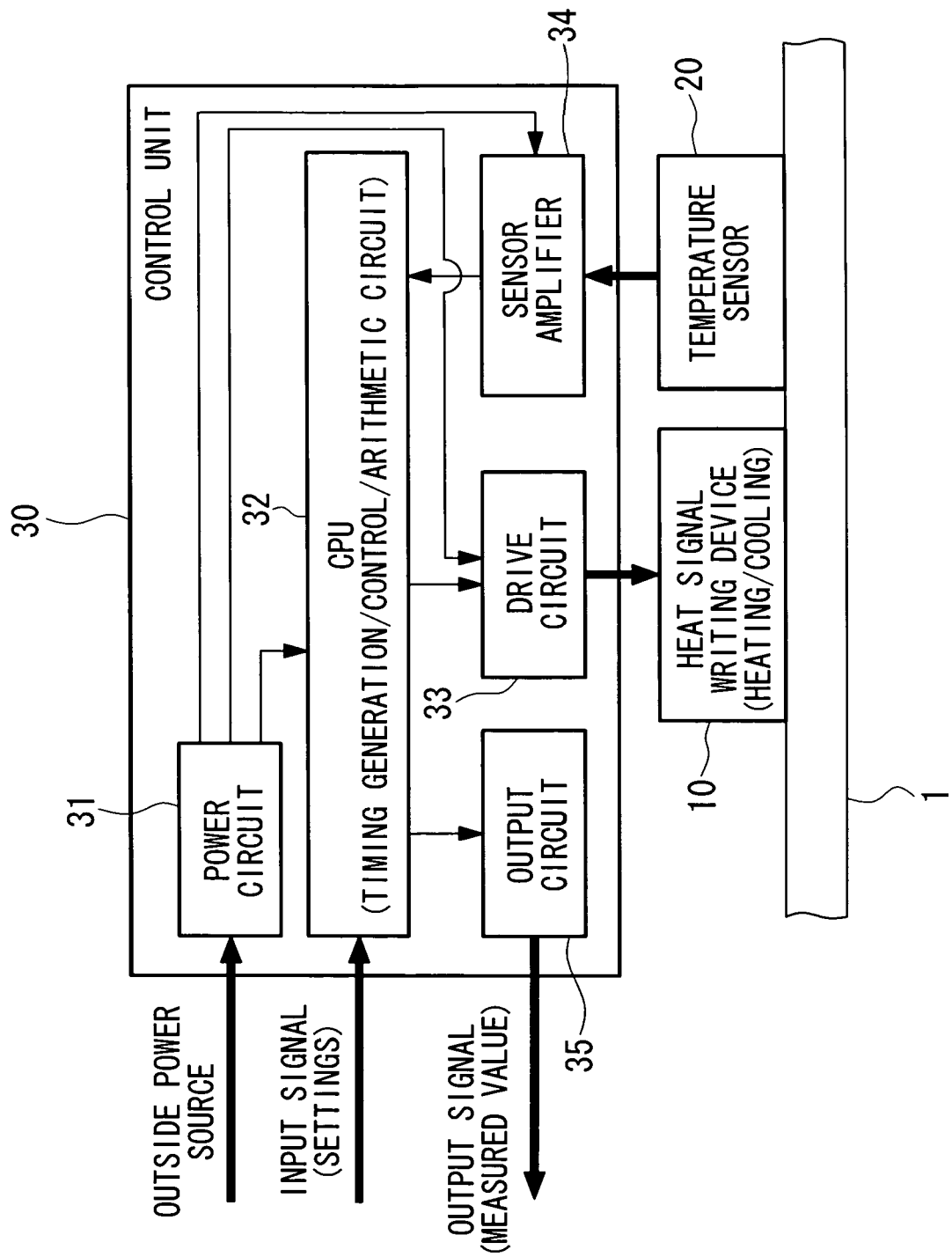
FIG. 3 is a block diagram of an example configuration of the flow rate detector shown in FIG. 2A.

FIG. 3 is a block diagram illustrating an example configuration of the control unit 30 including a power circuit 31 that receives power from an external power source used for the flow rate detector F; a CPU 32 that receives input signals for various settings from an external unit and performs various types of arithmetic processing and control; a drive circuit 33 that controls the power distribution to the Peltier elements 11 in order for the heat signal writing device 10 to write a heat signal; a sensor amplifier 34 that amplifies the value detected by the temperature sensor 20; and an output circuit 35 that outputs the calculated traveling volume and traveling velocity (i.e., measured values) of the medium to an external unit. In such a case, the external unit may be various switches and displays, for various settings, provided on the control unit 30 or may be a control unit of an apparatus that uses the measured values in a secondary manner.

The flow rate detector F that is configured as described above measures the traveling volume and traveling velocity of the medium flowing through the channel 1 at a flow rate v by employing a flow rate detection method described below. In this case, the medium flowing through the channel 1 may be a liquid, a gas, or a solid (powder). In the gas and solid cases, the channel 1 is limited to that having sealed pipes. However, for liquid, the channel 1 may be sealed or, instead, may be partially open, like a gutter.

The Peltier elements 11 of the heat signal writing device 10 receive power from the drive circuit 33 of the control unit 30 and write a heat signal by heating or cooling. The heat signal is transmitted to the channel 1 through the channel supporting members 12 in close contact with the Peltier elements 11 and is further transmitted from the walls of the channel 1 to the medium flowing through the inside. At this time, the heat signal written by the heat signal writing device 10 is not greatly lost because the channel supporting members 12 have excellent heat conductivity. Since the area of the channel contact surface, where the channel contact surfaces 12a contact the channel 1, is minimized, the writing pattern of the heat signal can be clearly transmitted to the channel 1 and the medium inside. In other words, the pattern of temperature change characteristic to the heat signal written by the heat signal writing device 10 is clearly transmitted and written in the medium flowing through the channel 1.

It is preferable that the temperature change of the heat signal written by the heat signal writing device 10, i.e., a heat signal with a temperature change according to a specific writing pattern, be a pulsed temperature change, a sine wave (or a similar wave) temperature change, or a triangular (or a similar shape) temperature change. The frequency of the writing pattern of such a heat signal can be appropriately changed to generate a specific heat signal. With a triangular temperature change, a specific heat signal can be generated by appropriately changing the duty ratio.

In addition to the frequency and duty ratio of the above-described writing pattern of the heat signal, the offset level can be appropriately changed to generate a specific heat signal.

When the heat signal writing device 10 writes a heat signal having a specific temperature change, a writing control signal for generating the timing of heating or cooling by the Peltier elements 11 is output from the CPU 32 to the drive circuit 33. Since the drive circuit 33 controls the power distributed to the Peltier elements 11 on the basis of the writing control signal, the flow direction and the current value of the current supplied to the Peltier elements 11 can be appropriately changed. As a result, since desired heating or cooling is performed by the Peltier elements 11 according to the power distribution, a heat signal can be written in the medium with a writing pattern having a specific temperature change.

Since the heat signal written in the medium in this way moves through the channel 1 along the flow of the medium, the heat signal is detected by the temperature sensor 20 mounted downstream in the flow direction. The detection result is input to the sensor amplifier 34 of the control unit 30 as an electrical signal, and a signal of the detected value amplified at the sensor amplifier 34 is input to the CPU 32. Since the measured distance L, which is equivalent to the traveling distance from the writing position where the heat signal is written to the detection position, is determined, the CPU 32 performs arithmetic processing to calculate the traveling volume and the traveling velocity of the medium on the basis of the time difference between the time the heat signal is written and the time it is detected. In other words, the time difference, which is the traveling time of the heat signal traveling the measurement distance L, is calculated, and the time difference is set as a heat conducting time T of the measured distance L.

Once the above-described heat conducting time T is determined, a traveling velocity V of the medium can be calculated by arithmetic processing based on the known measured distance L and a heat conducting speed S acquired in advance experimentally.

Once the traveling velocity V of the medium is calculated in this way, the traveling volume of the medium can be calculated from the product of the traveling velocity V, which is the flow rate, and the cross-sectional area of the channel 1. The traveling volume is a volumetric flow rate independent of the mass of the medium. The traveling velocity V and traveling volume of the medium calculated at the CPU 32 of the control unit 30 are output from the output circuit 35 to an external unit as measured values acquired by measuring the flow rate and volumetric flow rate of the medium.

According to the above-described flow rate detection method, the sensitivity of the measurement increases by setting a large measurement distance L, but there is a possibility of the written heat signal dispersing and disappearing due to heat conduction, etc. Therefore, the setting of the distance L becomes important, and it is preferable that the optimal value be selected according to the measurement conditions, setting sensitivity, and so on.

As described above, the heat signal writing device 10 according to the present invention includes a Peltier element 11 for writing the heat signal having a temperature change according to a desired pattern by heating or cooling; a channel supporting member 12 shaped as a pyramid formed of a heat conductive material and having a bottom surface in close contact with a surface of the Peltier element 11, the tip of the pyramid being in direct contact with the channel 1; a heat sink 13 in close contact with another surface of the Peltier element 11; and a heat-resistant cover for covering the periphery of the Peltier element 11, excluding a channel contact surface 12a at the tip, and the channel supporting member 12. Therefore, the area of the channel contact surfaces 12a, which are in direct contact with the channel 1 in order to write a heat signal, is minimized, and the writing position of the heat signal is limited to the channel contact surfaces 12a so that the effect of the ambient temperature on the writing of the heat signal is minimized. Furthermore, the heat radiation of the Peltier elements 11 can be increased to provide a clearer writing pattern of the heat signal. In this way, the detection accuracy of the thermal flowmeter using the heat signal writing device 10 is increased even more.

The present invention is not limited to the above-described embodiment, and modifications may be made within the scope of the invention.

The invention claimed is:

1. A heat signal writing device for writing a heat signal in a medium traveling through a channel, the device being secured to an appropriate position on the channel through which the medium flows, the device comprising:

a heat source element for writing the heat signal having a temperature change according to a desired pattern by heating or cooling;

a channel supporting member shaped as a pyramid formed of a heat conductive material and having a bottom surface in close contact with a surface of the heat source element, the tip of the pyramid being in direct contact with the channel;

a heat radiating member in close contact with another surface of the heat source element; and a heat-resistant cover for covering the periphery of the heat source element, excluding the channel contact surface at the tip, and the channel supporting member.

2. The heat signal writing device according to claim 1, wherein the heat signal writing device has a bisectional structure in which the tip of the channel supporting member supports the channel from both sides to write a heat signal.

3. The heat signal writing device according to claim 1, wherein the heat source element is a Peltier element.

* * * * *